United States Patent
Zhan et al.

(10) Patent No.: US 11,899,533 B2
(45) Date of Patent: Feb. 13, 2024

(54) STRIPE REASSEMBLING METHOD IN STORAGE SYSTEM AND STRIPE SERVER

(71) Applicant: HUAWEI CLOUD COMPUTING TECHNOLOGIES CO., LTD., Gui'an New District (CN)

(72) Inventors: Yun Zhan, Shenzhen (CN); Huiyun Xie, Shenzhen (CN); Tonglei Wang, Shenzhen (CN)

(73) Assignee: HUAWEI CLOUD COMPUTING TECHNOLOGIES CO., LTD., Gui'an New District (CN)

(*) Notice: Subject to any disclaimer, the term of this patent is extended or adjusted under 35 U.S.C. 154(b) by 283 days.

(21) Appl. No.: 17/356,849

(22) Filed: Jun. 24, 2021

(65) Prior Publication Data

US 2021/0326207 A1    Oct. 21, 2021

Related U.S. Application Data

(63) Continuation of application No. PCT/CN2019/103281, filed on Aug. 29, 2019.

(30) Foreign Application Priority Data

Dec. 25, 2018   (CN) .................... 201811589151.X

(51) Int. Cl.
  *G06F 11/10*   (2006.01)
  *G06F 3/06*    (2006.01)
  *G06F 12/02*   (2006.01)

(52) U.S. Cl.
  CPC ........ *G06F 11/1096* (2013.01); *G06F 3/0619* (2013.01); *G06F 3/0652* (2013.01);
  (Continued)

(58) Field of Classification Search
  CPC .. G06F 11/1096; G06F 3/0619; G06F 3/0652; G06F 3/0689; G06F 11/1092; G06F 12/0253
  See application file for complete search history.

(56) References Cited

U.S. PATENT DOCUMENTS

| | | | |
|---|---|---|---|
| 8,225,006 B1* | 7/2012 | Karamcheti | G06F 11/108 714/6.21 |
| 8,949,692 B1* | 2/2015 | Bonwick | G06F 12/0253 714/766 |

(Continued)

FOREIGN PATENT DOCUMENTS

| | | |
|---|---|---|
| CN | 102549554 A | 7/2012 |
| CN | 103902465 A | 7/2014 |

(Continued)

OTHER PUBLICATIONS

Q. Yao et al., "StripeMerge: Efficient Wide-Stripe Generation for Large-Scale Erasure-Coded Storage," 2021 IEEE 41st International Conference on Distributed Computing Systems (ICDCS), DC, USA, 2021, pp. 483-493 (Year: 2021).*

*Primary Examiner* — Matthew M Kim
*Assistant Examiner* — Indranil Chowdhury
(74) *Attorney, Agent, or Firm* — Rimon PC

(57) ABSTRACT

A stripe reassembling technique includes a stripe server that selects stripes; uses data chunks including valid data in the stripes $S_1$, $S_2$, and $S_3$ as data chunks in a new stripe $S_4$, and generates data of a parity chunk for data of the data chunks in $S_4$ according to an erasure coding (EC) algorithm the same as that of $S_1$, $S_2$, and $S_3$; and stores the parity data of the parity chunk on a parity storage node.

12 Claims, 5 Drawing Sheets

(52) U.S. Cl.
CPC ........ *G06F 3/0689* (2013.01); *G06F 11/1092* (2013.01); *G06F 12/0253* (2013.01)

(56) References Cited

U.S. PATENT DOCUMENTS

| | | | |
|---|---|---|---|
| 9,405,626 B1 | 8/2016 | Foley et al. | |
| 10,101,930 B2 | 10/2018 | Salessi et al. | |
| 10,437,675 B2 * | 10/2019 | Ben Dayan | G06F 3/0664 |
| 11,150,986 B2 * | 10/2021 | Li | H03M 13/154 |
| 11,239,864 B2 * | 2/2022 | Hallak | H03M 13/251 |
| 11,704,053 B1 * | 7/2023 | Tal | G06F 3/061 |
| | | | 711/114 |
| 11,740,971 B2 * | 8/2023 | Ben Dayan | G06F 11/1088 |
| | | | 714/764 |
| 11,748,197 B2 * | 9/2023 | Malluhi | G06F 9/30029 |
| | | | 711/114 |
| 2013/0227346 A1 * | 8/2013 | Lee | G06F 11/108 |
| | | | 714/6.24 |
| 2014/0365726 A1 * | 12/2014 | Bennett | G06F 3/0614 |
| | | | 711/114 |
| 2015/0205670 A1 | 7/2015 | Bonwick | |
| 2016/0077745 A1 * | 3/2016 | Patel | G06F 12/0253 |
| | | | 714/704 |
| 2016/0188410 A1 * | 6/2016 | Lee | G06F 11/1044 |
| | | | 714/6.24 |
| 2018/0239671 A1 * | 8/2018 | Wei | G06F 12/0253 |
| 2018/0307560 A1 * | 10/2018 | Vishnumolakala | G06F 3/067 |
| 2019/0114076 A1 * | 4/2019 | Wei | G06F 3/061 |
| 2020/0233602 A1 * | 7/2020 | Li | G06F 3/067 |
| 2021/0318826 A1 * | 10/2021 | Wei | G06F 3/0631 |
| 2022/0129164 A1 * | 4/2022 | Shveidel | G06F 3/064 |
| 2022/0365850 A1 * | 11/2022 | Chiba | G06F 3/0632 |
| 2023/0046216 A1 * | 2/2023 | Daga | G06F 3/0635 |
| 2023/0237020 A1 * | 7/2023 | Gupta | G06F 11/00 |
| | | | 707/692 |
| 2023/0259425 A1 * | 8/2023 | Yamamoto | G06F 11/1076 |
| | | | 714/801 |
| 2023/0273877 A1 * | 8/2023 | Shatsky | G06F 3/0689 |
| | | | 711/114 |

FOREIGN PATENT DOCUMENTS

| | | |
|---|---|---|
| CN | 105739915 A | 7/2016 |
| CN | 108475232 A | 8/2018 |
| CN | 109814805 A | 5/2019 |
| EP | 2933733 A1 | 10/2015 |
| WO | 2017173623 A1 | 10/2017 |

* cited by examiner

STRIPE REASSEMBLING METHOD IN STORAGE SYSTEM AND STRIPE SERVER

CROSS-REFERENCE TO RELATED APPLICATIONS

This application is a continuation of International Application No. PCT/CN2019/103281, filed on Aug. 29, 2019, which claims priority to Chinese Patent Application No. 201811589151.X, filed on Dec. 25, 2018, the disclosures of which are hereby incorporated by reference in their entirety.

TECHNICAL FIELD

The present invention relates to the field of information technologies, and in particular, to a stripe reassembling method in a storage system and a stripe server.

BACKGROUND

A distributed storage system includes a plurality of storage nodes. When a client receives a write request sent by a host and writes data into the distributed storage system, the data is stored in a corresponding storage node in a form of a stripe. For example, according to an erasure coding (EC) algorithm, the quantity of data chunks in a stripe is N, the quantity of parity chunks in the stripe is M, and the length of the stripe is N+M, where both N and M are positive integers. In the distributed storage system, a stripe with a length of N+M includes N+M chunks with a same length, and each chunk is distributed on one storage node in the distributed storage system. Therefore, one chunk is distributed on N+M storage nodes.

The client receives a write request, where the write request is used to modify data of a data chunk that has been stored in a stripe. Generally, the client writes the data of the write request to a new stripe, and marks the data of a data chunk in an original stripe as invalid. When a quantity of data chunks that are marked as invalid in a stripe reaches a threshold, the distributed storage system reassembles the stripe, and reassembles the valid data of data chunks in a plurality of stripes into a new stripe. In this process, valid data needs to be migrated across storage nodes.

SUMMARY

This application provides a stripe reassembling method in a storage system and a computer program product, to reduce cross-node migration of valid data in a stripe reassembling process.

According to a first aspect, this application provides a stripe reassembling method in a storage system. The storage system includes N data storage nodes that store data chunks and M parity storage nodes that store parity chunks. R stripes are distributed on the N+M storage nodes, each stripe $S_i$ includes N data chunks and M parity chunks. A data chunk $D_{ix}$ is distributed on an $x^{th}$ storage node in the N data storage nodes, and a parity chunk $P_{iy}$ is distributed on a $y^{th}$ storage node in the M parity storage nodes. N, M, and R are positive integers. R is not less than 2. The value of i is an integer ranging from 1 to R, the value of x is an integer ranging from 1 to N, and the value of y is an integer ranging from 1 to M. A stripe server selects the R stripes, where a maximum of one data chunk includes valid data in data chunks $D_{ix}$ that are in the R stripes and that are distributed on a same data storage node. In this solution, the stripe server generates parity data of a parity chunk $P_{Ky}$ in a new stripe $S_K$ for the data of the data chunk including valid data in the R stripes, where K is an integer different from 1 to R. The new stripe $S_K$ includes the data chunk including valid data in the R stripes and the parity chunk $P_{Ky}$. The stripe server stores the parity data of the parity chunk $P_{Ky}$ on the $y^{th}$ storage node in the M parity storage nodes. In the stripe reassembling method, a data chunk including valid data in a plurality of stripes is used as a data chunk in a new stripe. In addition, a maximum of one data chunk includes valid data in data chunks $D_x$ that are in the plurality of stripes and that are on distributed a same data storage node. Therefore, data of the data chunk does not need to be migrated across storage nodes during stripe reassembling.

With reference to the first aspect of this application, in a possible implementation, the method further includes: After the stripe server stores the parity data of the parity chunk $P_{Ky}$ on the $y^{th}$ parity storage node in the M parity storage nodes, the stripe server indicates a data storage node on which a data chunk that stores garbage data of the R stripes is distributed to perform garbage collection. In another implementation, the data storage node checks a status of stored data of a data chunk, and starts garbage collection when the data of the data chunk is determined as garbage data. In an implementation, when storing the data of the data chunk, the data storage node creates a mapping between a host access address of the data of the data chunk and an identifier of the data chunk. When the data of the data chunk is garbage data, the mapping between the host access address of the data of the data chunk and the identifier of the data chunk is marked as invalid, so that the data of the data chunk is determined as garbage data. Further, the data storage node may perform garbage collection in the data chunk after the stripe server releases a stripe including the data chunk. In another implementation, the data storage node may determine, based on an amount of garbage data of the data chunk stored in the data storage node, to start garbage collection. Alternatively, a parity storage node may determine, based on whether data of a parity chunk is garbage data, whether to start garbage collection, or perform garbage collection based on an indication of the stripe server.

With reference to the first aspect of this application and the foregoing possible implementation of the first aspect, in another possible implementation, the stripe server records a mapping between the new stripe and a chunk identifier, where the chunk identifier includes an identifier of the data chunk storing valid data in the R stripes and an identifier of the parity chunk in the new stripe.

With reference to the first aspect of this application and the foregoing possible implementations of the first aspect, in another possible implementation, the stripe server releases the R stripes. After the stripe server releases the R stripes, the R stripes may be reallocated to newly written data.

With reference to the first aspect of this application and the foregoing possible implementations of the first aspect, in another possible implementation, the stripe server determines the stripe $S_i$, where a quantity of data chunks including garbage data in the stripe $S_i$ meets a reassembly threshold. The stripe server determines, based on a quantity of data chunks including garbage data in a stripe, whether the reassembly threshold is reached in the stripe. The stripe server records a stripe in which the reassembly threshold is reached. In an implementation, an identifier of the stripe in which the reassembly threshold is reached may be recorded by using a link.

According to a second aspect, this application provides a stripe server. The stripe server is used in a storage system, and the storage system includes N data storage nodes storing data chunks and M parity storage nodes storing parity chunks. R stripes are distributed on the N+M storage nodes, each stripe $S_i$ includes N data chunks and M parity chunks, a data chunk $D_{ix}$ is distributed on an $x^{th}$ storage node in the N data storage nodes, and a parity chunk $P_{iy}$ is distributed on a $y^{th}$ storage node in the M parity storage nodes. N, M, and R are positive integers, R is not less than 2, a value of i is an integer ranging from 1 to R, a value of x is an integer ranging from 1 to N, and a value of y is an integer ranging from 1 to M. The stripe server includes an interface and a processor, the interface communicates with the processor, and the processor is configured to perform the first aspect of this application and the possible implementations of the first aspect.

According to a third aspect, this application provides a stripe server. The stripe server is used in a storage system, and the storage system includes N data storage nodes storing data chunks and M parity storage nodes storing parity chunks. R stripes are distributed on the N+M storage nodes, each stripe $S_i$ includes N data chunks and M parity chunks, a data chunk $D_{ix}$ is distributed on an $x^{th}$ storage node in the N data storage nodes, and a parity chunk $P_{iy}$ is distributed on a $y^{th}$ storage node in the M parity storage nodes. N, M, and R are positive integers, R is not less than 2, a value of i is an integer ranging from 1 to R, a value of x is an integer ranging from 1 to N, and a value of y is an integer ranging from 1 to M. The stripe server includes corresponding units, and each unit is configured to perform corresponding operations of the first aspect of this application and the possible implementations of the first aspect.

According to a fourth aspect, this application provides a computer program product. The computer program product includes a computer instruction, the computer program product is used in a storage system, and the storage system includes N data storage nodes storing data chunks and M parity storage nodes storing parity chunks. R stripes are distributed on the N+M storage nodes, each stripe $S_i$ includes N data chunks and M parity chunks, a data chunk $D_{ix}$ is distributed on an $x^{th}$ storage node in the N data storage nodes, and a parity chunk $P_{iy}$ is distributed on a $y^{th}$ storage node in the M parity storage nodes. N, M, and R are positive integers, R is not less than 2, a value of i is an integer ranging from 1 to R, a value of x is an integer ranging from 1 to N, and a value of y is an integer ranging from 1 to M. A stripe server that is used in the storage system executes the computer instruction, to perform the first aspect of this application and the possible implementations of the first aspect.

EMBODIMENTS OF THE PRESENT INVENTION

Figure 1:
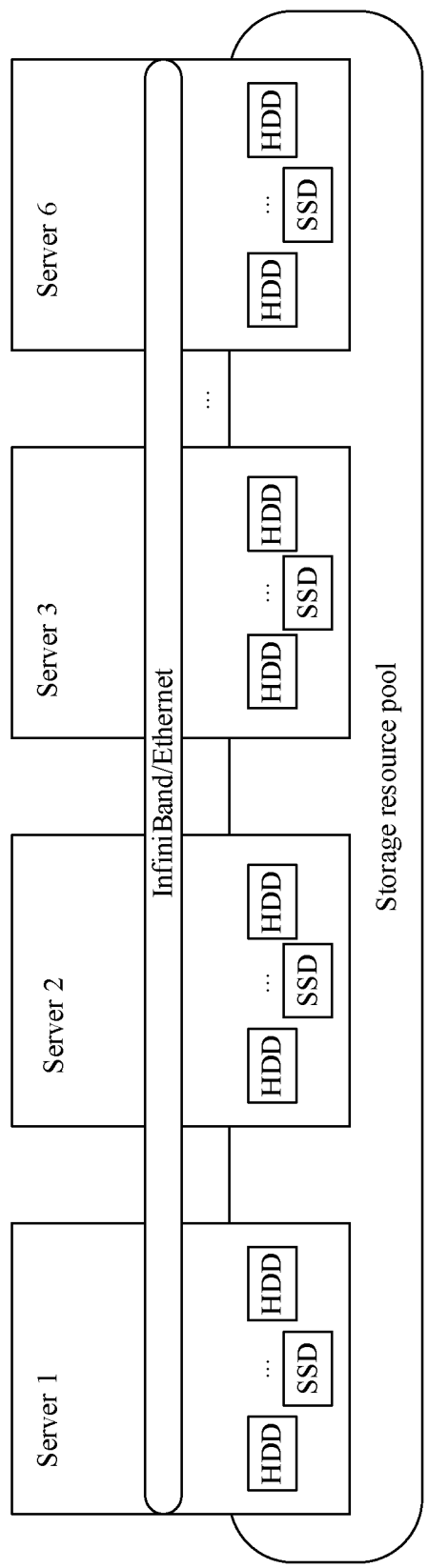
FIG. 1 is a schematic diagram of a distributed storage system according to an embodiment of the present invention.

A storage system in the embodiments of the present invention may be a distributed storage system, for example, FusionStorage® series or OceanStor® 9000 series of Huawei®. For example, as shown in FIG. 1, a distributed storage system includes a plurality of servers, such as a server 1, a server 2, a server 3, a server 4, a server 5, and a server 6. The servers communicate with each other through InfiniBand, the Ethernet, or the like. In the embodiments of the present invention, the server in the distributed storage system is also referred to as a storage node. In a practical application, a quantity of servers in the distributed storage system may be increased based on an actual requirement. This is not limited in the embodiments of the present invention. It should be noted that the storage node may alternatively be a hard disk (for example, a disk or a solid-state drive), a storage array, or a server chassis, provided that chunks in a same stripe are located in different hard disks. The following uses an example in which the storage node is a server for description. In other cases, a principle is the same, and details are not described in the present invention.

Figure 2:
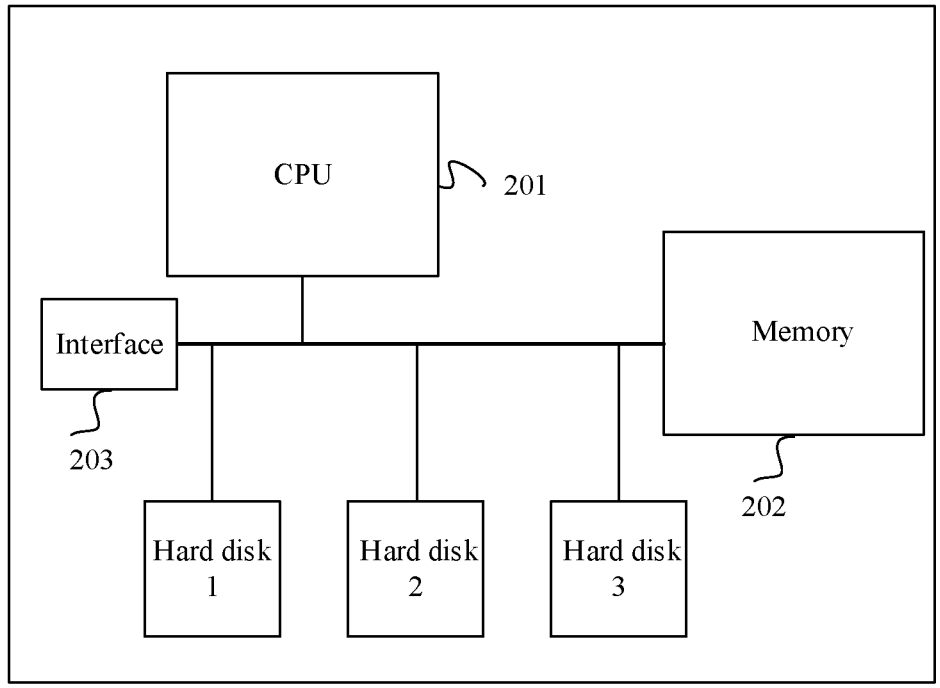
FIG. 2 is a schematic structural diagram of a server in a distributed block storage system according to an embodiment of the present invention.

The server in the distributed storage system is in a structure shown in FIG. 2. As shown in FIG. 2, each server in the distributed storage system includes a central processing unit (CPU) 201, a memory 202, an interface 203, a hard disk 1, a hard disk 2, and a hard disk 3. The memory 202 stores a computer instruction, and the CPU 201 executes the computer instruction in the memory 202 to perform a corresponding operation. The interface 203 may be a hardware interface, for example, a network interface card (NIC) or a host bus adapter (HBA), or may be a program interface module. A hard disk includes a solid-state drive (SSD), a hard disk drive, or a hybrid hard disk. In a hard disk drive such as an Hard Disk Drive (HDD), a hard disk interface may be a serial advanced technology attachment (SATA) interface, a serial attached small computer system interface (SAS) interface, a fiber channel (FC) interface, a peripheral component interconnect-express (PCIe) interface, a non-volatile memory express (NVMe) interface, or the like. The CPU 201 may be replaced by a field programmable gate array (FPGA) or other hardware, or an FPGA or other hardware and the CPU 201 jointly perform the foregoing corresponding operation. For ease of description, in the embodiments of the present invention, the CPU 201 and the memory 202 are referred to as a processor, or hardware that replaces the CPU 201 and the memory 202 is referred to as a processor, or a combination of the CPU 201, the memory 202, and other hardware is referred to as a processor.

A client in the distributed storage system writes data into the distributed storage system based on a write request of a host, or reads data from the distributed storage system based on a read request of the host. The server in the embodiments of the present invention may be used as a client. In addition, the client may also be a device independent of the server shown in FIG. 2. The host in the embodiments of the present invention may be a server, a virtual machine (VM), a terminal device, or the like. This is not limited in the embodiments of the present invention. The client in the distributed storage system provides a storage resource of the distributed storage system for the host. For example, in a distributed block storage system, a client provides a block resource such as a logical unit for a host, to provide a data access operation for the host. The logical unit is also referred to as a logical unit number (LUN). In a distributed file storage system, a client provides a file resource for a host. In a distributed object storage system, a client provides an object resource for a host.

Figure 3:
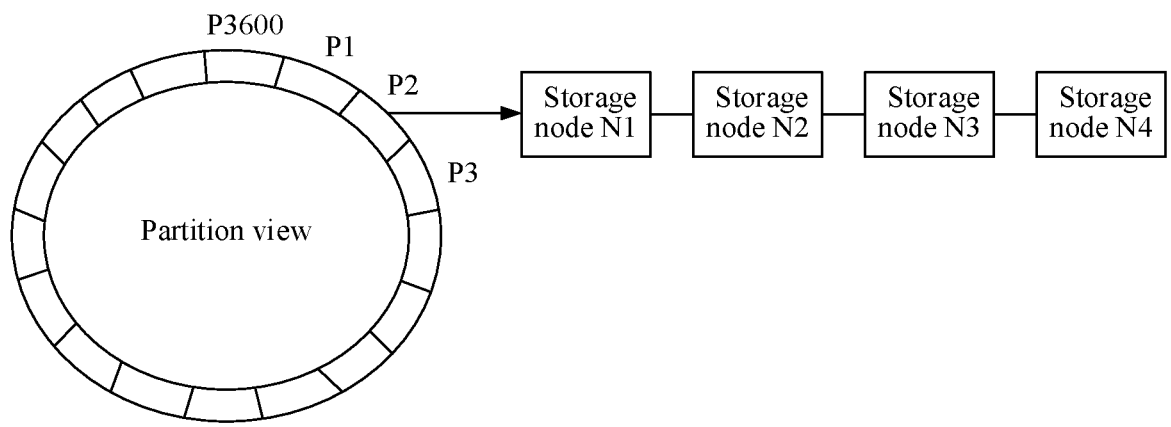
FIG. 3 is a schematic diagram of a partition view of a distributed block storage system according to an embodiment of the present invention.

In the embodiments of the present invention, the distributed block storage system is used as an example. A client provides a block protocol access interface, so that the client provides a distributed block storage access point service. A host may access a storage resource in a storage resource pool in the distributed block storage system by using the client. Generally, the block protocol access interface is configured to provide a logical unit for the host. A server runs a program of the distributed block storage system, so that a server that includes a hard disk is used as a storage node to store data of the client. For example, one hard disk may be used as one storage node by default in the server. When the server includes a plurality of hard disks, one server may be used as a plurality of storage nodes. In another implementation, the server runs the program of the distributed block storage system program to serve as one storage node. This is not limited in the embodiments of the present invention. Therefore, for a structure of the storage node, refer to FIG. 3 and related description. During initialization of the distributed block storage system, hash space (for example, 0 to 2^32) is divided into N equal parts, each equal part is one partition (Partition), and the N equal parts are equally allocated based on a quantity of hard disks. For example, in the distributed block storage system, N is 3600 by default, partitions are P1, P2, P3, . . . , and P3600. Assuming that the distributed block storage system currently includes 18 disks (storage nodes), each storage node carries 200 partitions. A partition P includes M storage nodes $N_j$. A correspondence between a partition and a storage node, that is, a mapping between a partition and a storage node $N_j$ included in the partition, is also referred to as a partition view. As shown in FIG. 3, in an example in which a partition includes four storage nodes $N_j$, a partition view is "P2-a storage node $N_1$ (a data storage node)—a storage node $N_2$ (a data storage node)—a storage node $N_3$ (a data storage node)—a storage node $N_4$ (a parity storage node)", where j is an integer ranging from 1 to M. The partition view may be allocated during the initialization of the distributed block storage system, and may be subsequently adjusted based on a change of the quantity of hard disks in the distributed block storage system. The client saves the partition view.

Based on a reliability requirement of the distributed block storage system, data reliability may be improved by using an erasure coding (EC) algorithm. For example, a 3+1 mode is used, a stripe includes three data chunks and one parity chunk. In the embodiments of the present invention, data is stored in a partition in a form of stripe, and one partition includes R stripes $S_i$, where i is an integer ranging from 1 to R. In the embodiments of the present invention, P2 is used as an example for description.

It should be noted that a stripe is logical storage space, the stripe includes a plurality of chunks, and a chunk is also referred to as a chunk unit. "Data of a chunk" is content stored in the chunk.

Chunks included in a stripe include a data chunk and a parity chunk (parity chunk). A chunk used to store data (based on application scenarios, data may be user data, service data, and application data) is referred to as a data chunk, and a chunk used to store parity data is referred to as a parity chunk. There is a parity relationship between data and parity data. According to the EC algorithm, when content in some chunks is faulty or cannot be read, content in the other chunks may be used to restore. In the embodiments of the present invention, a storage node that stores data of a data chunk is referred to as a data storage node, a storage node that stores parity data of a parity chunk is referred to as a parity storage node, and the data storage node and the parity storage node are collectively referred to as storage nodes.

Figure 4:
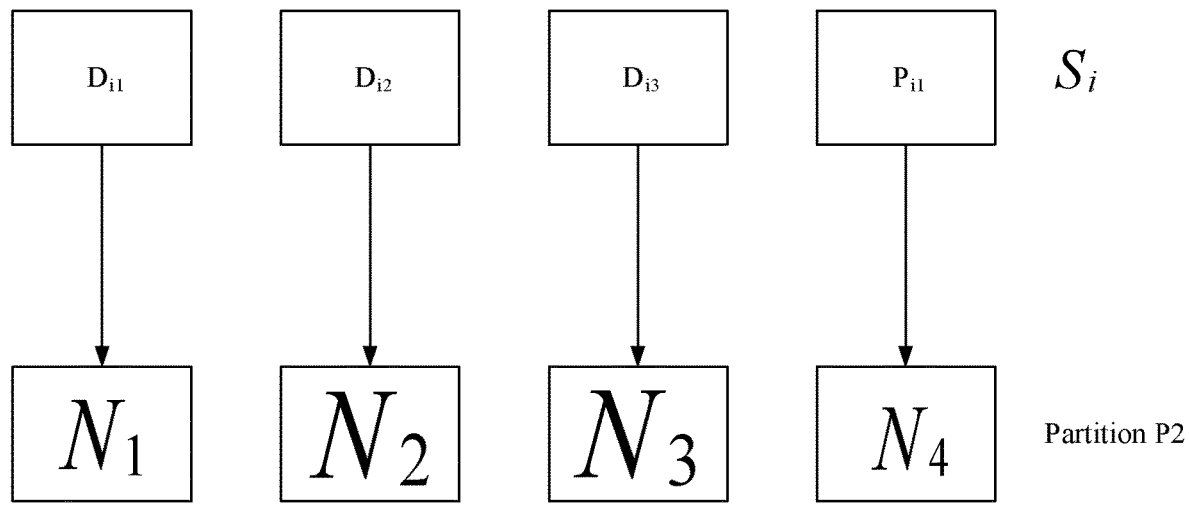
FIG. 4 is a schematic diagram of a relationship between a chunk and a storage node in a distributed block storage system according to an embodiment of the present invention.

In the distributed block storage system, slice management is performed on the hard disk by 8 KB (KB), and allocation information of each 8 KB slice is recorded in a metadata management area of the hard disk. Slices of the hard disk form a storage resource pool. The distributed block storage system includes a stripe server. An implementation may be that a stripe management program is run on one or more servers in the distributed block storage system. The stripe server allocates a stripe to a partition. For a structure of the stripe server, refer to the server structure shown in FIG. 2. Still using the partition view shown in FIG. 4 as an example, the stripe server allocates a stripe with a length 4 based on the partition view shown in FIG. 4. The stripe includes three data chunks and one parity chunk. The stripe server allocates, to a stripe $S_i$ of a partition P2, a storage address, that is, storage space, from a data storage node $N_x$ that stores a data chunk $D_{ix}$ corresponding to the partition, and a storage address from a parity storage node $D_{iy}$ of a parity chunk $P_y$ corresponding to the partition. This includes: allocating, to $D_{i1}$, a storage address from a data storage node $N_1$ that stores data chunks, allocating, to $D_{i2}$, a storage address from a data storage node $N_2$ that stores data chunks, allocating, to $D_{i3}$, a storage address from a data storage node $N_3$ that stores data chunks, and allocating, to $P_{i1}$, a storage address from a parity storage node $N_1$ (a storage node $N_4$ in FIG. 4) that stores parity chunks. In another implementation, the stripe server does not allocate, to the stripe $S_i$ of the partition $P_2$, a storage address from the data storage node $N_x$ that stores the data chunk $D_{ix}$ corresponding to the partition, or a storage address from the storage node $D_{iy}$ of the parity chunk $P_y$ corresponding to the partition. When the client writes data to a storage node, the data storage node $N_x$ that stores data chunks allocates a storage address to the data chunk $D_{ix}$, and the parity storage node $N_y$ that stores parity chunks allocates a storage address to the parity chunk $P_{iy}$, where a value of x is an integer ranging from 1 to 3, and a value of y is 1. In the embodiments of the present invention, a storage address allocated to a chunk may be a logical address of a hard disk in the storage node, for example, a logical block address (LBA) of the hard disk. In another implementation, in an SSD that supports an open channel, a storage address allocated to a chunk may alternatively be a physical address of the SSD. In another implementation, when an LUN is mounted on a storage node, a storage address allocated to a chunk is an LBA of the LUN. Stripe metadata records a mapping relationship between a stripe identifier and a chunk identifier, a correspondence between $S_i$, the data chunk $D_{ix}$, and the parity chunk $P_{iy}$. A chunk included in the stripe $S_i$ may be found based on the correspondence. The stripe server further records a correspondence between a chunk and the stripe $S_i$. Based on the correspondence, the stripe $S_i$ may be found by using the chunk, so that stripe information, for example, all chunks included in $S_i$, is queried.

To reduce the quantity of chunk identifiers managed by the stripe server, the stripe server allocates a version number to a chunk identifier in a stripe. After a stripe is released, a version number of a chunk identifier of a chunk in the released stripe is updated, so that a version number of the chunk identifier is used as a chunk identifier of a chunk in a new stripe. The stripe server pre-allocates a chunk to the stripe $S_i$, so that the waiting time may be reduced when the client writes data, thereby improving write performance of the distributed block storage system. In the embodiments of the present invention, a chunk in the stripe $S_i$ has a unique identifier in the distributed block storage system.

Figure 5:
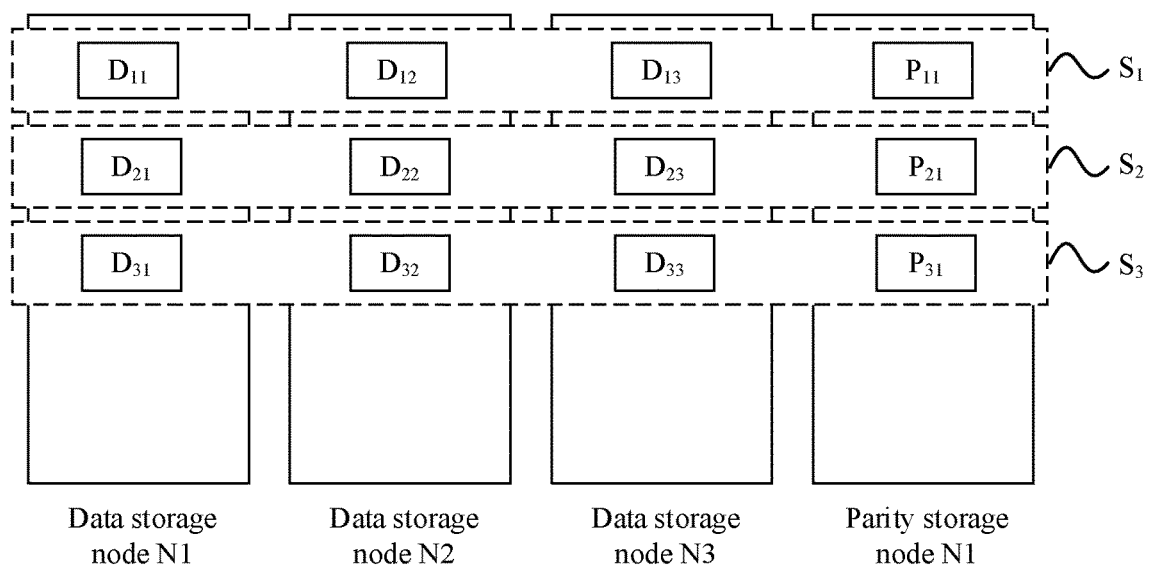
FIG. 5 is a schematic diagram of distribution of stripes according to an embodiment of the present invention.
Figure 6:
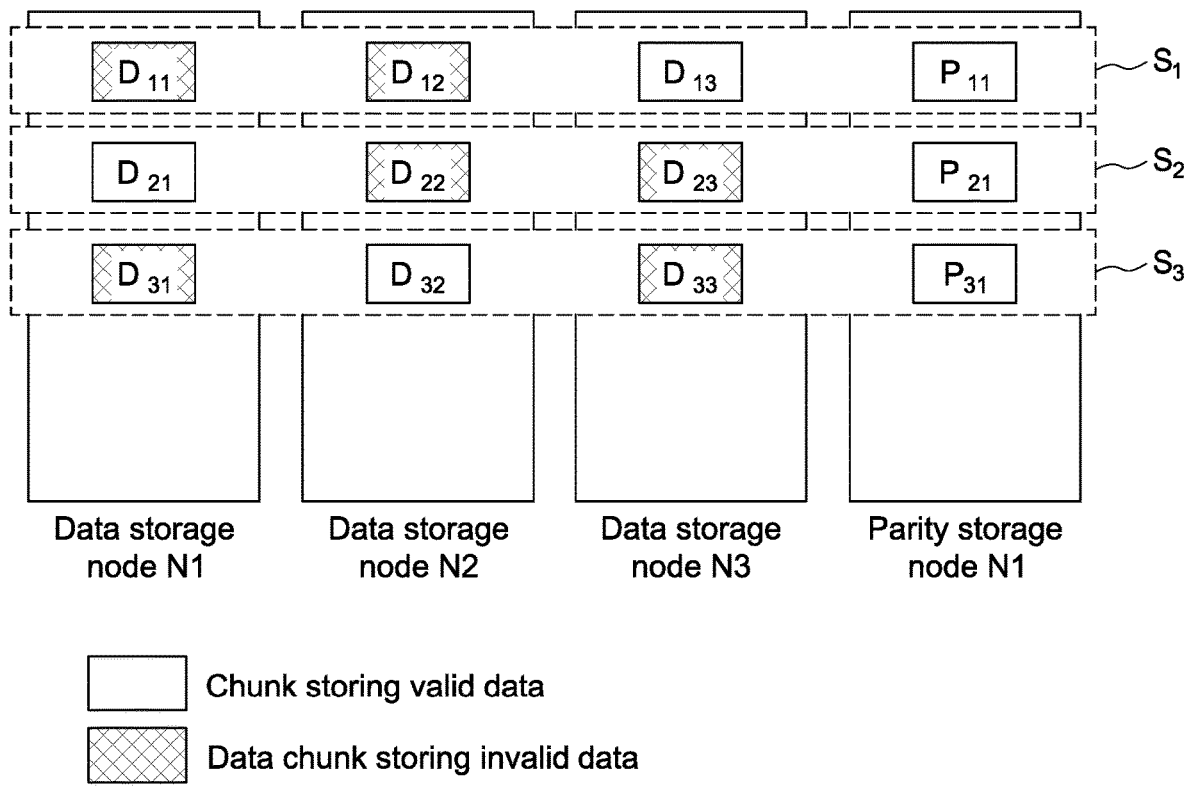
FIG. 6 is a schematic diagram of garbage data in stripes according to an embodiment of the present invention.

In the embodiments of the present invention, an example in which a stripe length is 4 is used. The stripe includes three data chunks and one parity chunk. Distribution of stripes on storage nodes is shown in FIG. 5. A stripe $S_1$ includes data chunks $D_{11}$, $D_{12}$, and $D_{13}$, and a parity chunk $P_{11}$, a stripe $S_2$ includes data chunks Dei, $D_{22}$, and $D_{23}$, and a parity chunk $P_{21}$, and a stripe $S_3$ includes data chunks $D_{31}$, $D_{32}$, and $D_{33}$ and a parity chunk $P_{31}$. Data of the data chunks $D_{11}$, $D_{21}$, and $D_{31}$ is stored on a data storage node $N_1$ that stores data chunks, data of the data chunks $D_{12}$, $D_{22}$, and $D_{32}$ is stored on a data storage node $N_2$ that stores data chunks, data of the data chunk $D_{13}$, $D_{23}$, and $D_{33}$ is stored on a data storage node $N_3$ that stores data chunks, and parity data of the parity chunks $P_{11}$, $P_{21}$, and $P_{31}$ is stored on a parity storage node $N_1$ that stores parity chunks. A host modifies stored data, for example, modifies data of the data chunks $D_{11}$, $D_{12}$, $D_{22}$, $D_{23}$, $D_{31}$, and $D_{33}$. The storage system provided in the embodiments of the present invention supports only appending, when existing data is modified only, modified data is stored in a new data chunk, and the modified data does not occupy a data chunk used to store data before the modification. In an appending-based storage system, after data is modified in a data chunk, data in a data chunk that stores the data before the modification becomes garbage data, that is, invalid data. Therefore, as shown in FIG. 6, the data of the data chunks $D_{11}$, $D_{12}$, $D_{22}$, $D_{23}$, $D_{31}$, and $D_{33}$ is marked as garbage data. When an amount of garbage data in the stripe reaches a reassembly threshold, the stripe server starts a stripe reassembling operation. The stripe server determines, based on a quantity of data chunks including garbage data in the stripe $S_i$, that the stripe $S_i$ reaches the reassembly threshold. The stripe server determines, based on a quantity of data chunks including garbage data in a stripe, whether the reassembly threshold is reached in the stripe. The stripe server records a stripe in which the reassembly threshold is reached. In one implementation, an identifier of the stripe in which the reassembly threshold is reached may be recorded using a link.

Figure 7:
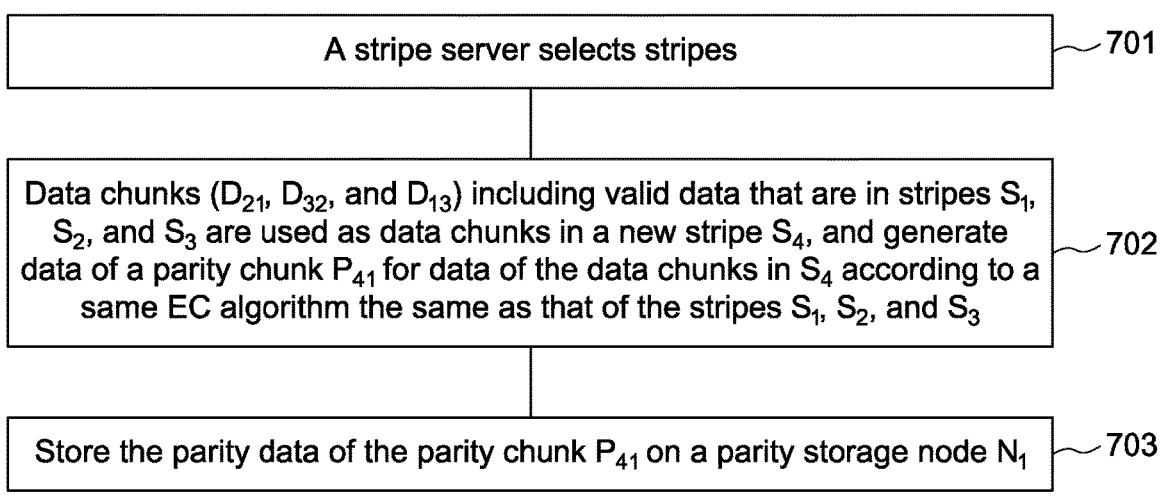
FIG. 7 is a flowchart of a stripe reassembling method according to an embodiment of the present invention.

In an embodiment of the present invention shown in FIG. 7, step 701: A stripe server selects stripes.

The selected stripes are to-be-reassembled stripes, and in the to-be-reassembled stripes, there is a maximum of one data chunk that includes valid data in data chunks distributed on a same data storage node. For example, chunk distribution of stripes $S_1$, $S_2$, and $S_3$ is the same, and there are three groups of data chunks on three data storage nodes. A first group includes $D_{11}$, $D_{21}$, and $D_{31}$, the second group includes $D_{12}$, $D_{22}$, and $D_{32}$, and the third group includes $D_{13}$, $D_{23}$, and $D_{33}$. As shown in FIG. 6, in the stripes $S_1$, $S_2$, and $S_3$, only one data chunk includes valid data in the data chunks distributed on a same data storage node. Therefore, the stripes $S_1$, $S_2$, and $S_3$ are selected for reassembling. In other words, $S_1$, $S_2$, and $S_3$ are selected for reassembling because:

(1) the stripes participating in reassembling each have a data chunk that stores valid data; and (2) the data chunks including valid data in the stripes participating in reassembling are not distributed on a same data storage node, that is, y in $D_{iy}$ is different.

In some embodiments of the present invention, valid data is data whose host access address undergoes no write operation after the data is written into a data storage node.

Step 702: Use the data chunks ($D_{21}$, $D_{32}$, and $D_{13}$) including valid data in the stripes $S_1$, $S_2$, and $S_3$ as data chunks in a new stripe $S_4$, and generate data of a parity chunk $P_{41}$ for data of the data chunks in $S_4$ according to an EC algorithm the same as that of $S_1$, $S_2$, and $S_3$.

Step 703: Store the parity data of the parity chunk $P_{41}$ on a parity storage node $N_1$.

The stripe server records a mapping between the stripe $S_4$ and the chunks $D_{21}$, $D_{32}$, $D_{13}$, and $P_{41}$, and the chunks $D_{21}$, $D_{32}$, $D_{13}$, and $P_{41}$ are chunks in the stripe $S_4$.

Figure 8:
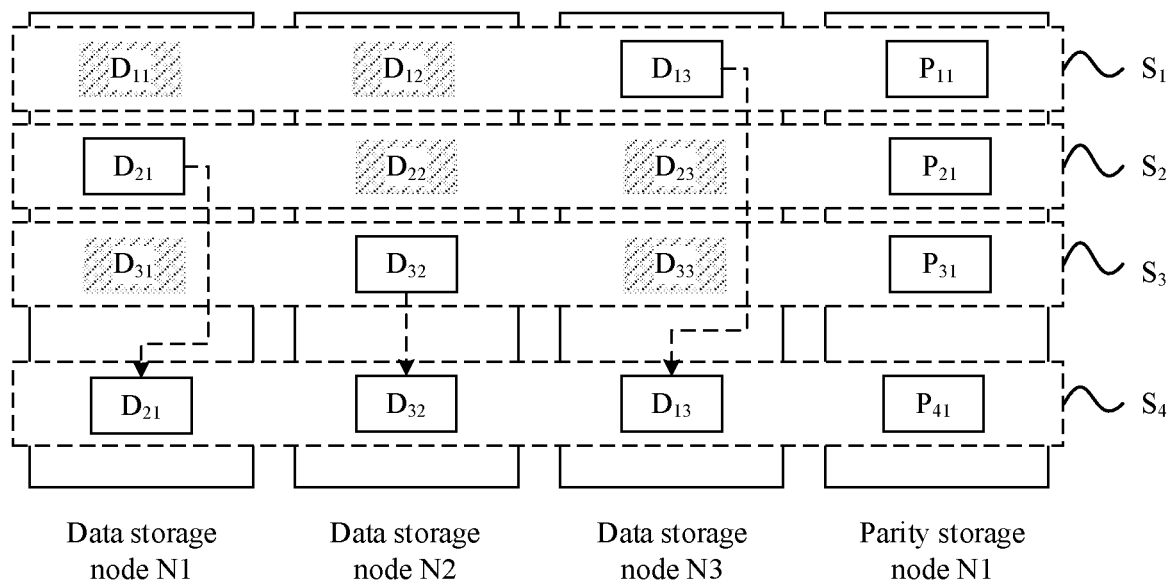
FIG. 8 is a schematic diagram of stripe reassembling distribution according to an embodiment of the present invention.

In the embodiment shown in FIG. 7, the data chunks $D_{21}$, $D_{32}$, and $D_{13}$ are reassembled into the stripe $S_4$ shown in FIG. 8. In the stripe $S_4$ shown in FIG. 8, data of the data chunks $D_{21}$, $D_{32}$, and $D_{13}$ does not need to be moved, and does not need to be migrated across storage nodes.

Further, the stripe server instructs a storage node on which a data chunk that stores garbage data is distributed to perform garbage collection. In this embodiment of the present invention, the stripe server instructs data storage nodes that store data of the data chunks $D_{11}$, $D_{12}$, $D_{22}$, $D_{23}$, $D_{31}$, and $D_{33}$ to perform garbage collection. Further, parity data stored in $P_{11}$, $P_{21}$, and $P_{31}$ is meaningless. Therefore, the stripe server further instructs the parity storage node that stores the parity data of the parity chunks $P_{11}$, $P_{21}$, and $P_{31}$ to perform garbage collection. After a storage node performs garbage collection, storage space occupied by garbage data on the storage node is released. In another implementation, a storage node performs garbage collection based on a status of stored data of a chunk. For example, a data storage node checks a status of stored data of a data chunk, and starts garbage collection when the data of the data chunk is determined as garbage data. In an implementation, when storing the data of the data chunk, the data storage node creates a mapping between a host access address of the data of the data chunk and an identifier of the data chunk. When the data of the data chunk is garbage data, the mapping between the host access address of the data of the data chunk and the identifier of the data chunk is marked as invalid, so that the data of the data chunk is determined as garbage data. Further, the data storage node may perform garbage collection in the data chunk after the stripe server releases a stripe including the data chunk. In another implementation, the data storage node may determine, based on an amount of garbage data in data chunks stored in the data storage node, to start garbage collection. For example, a total quantity of data chunks stored in the data storage node is 1000, and a quantity of data chunks that stores garbage data is 600. If a threshold for starting garbage collection by the data storage node is 60%, when a quantity of data chunks that stores garbage data reaches 60%, the data storage node starts garbage collection. Therefore, each data storage node in a distributed system may independently perform garbage collection in a data chunk. This embodiment of the present invention is also applicable to garbage collection by a parity storage node that stores parity chunks. In this embodiment of the present invention, a stripe is reassembled with another stripe, data of a parity chunk in the original stripe is garbage data, and garbage collection described in this embodiment of the present invention also needs to be performed. For an implementation, refer to garbage collection in a data chunk. In this embodiment of the present invention, a plurality of storage nodes may independently perform garbage collection in a chunk by stripe reassembling.

The stripe server releases the stripes $S_1$, $S_2$, and $S_3$. That the stripe server releases the stripes $S_1$, $S_2$, and $S_3$ includes: The stripe server sets the stripes $S_1$, $S_2$, and $S_3$ to an idle state, so that new data may be subsequently allocated to the stripes $S_1$, $S_2$, and $S_3$.

According to stripe reassembling method provided in this embodiment of the present invention, valid data does not need to be migrated across storage nodes, thereby improving stripe reassembling performance of a storage system.

In this embodiment of the present invention, in the selected to-be-reassembled stripes, a maximum of one data chunk includes valid data in data chunks distributed on a same data storage node. An implementation may be that in the to-be-reassembled stripes, no data chunk includes valid data in data chunks distributed on a same data storage node. In this scenario, data chunks in a reassembled stripe include an idle data chunk, no data chunk includes valid data at a same location, and content of the data chunks at the same location is empty in a new stripe. In an implementation of this embodiment of the present invention, two stripes may be further reassembled.

Figure 9:
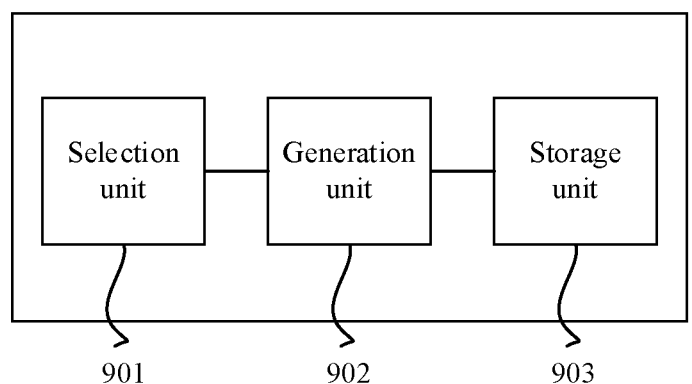
FIG. 9 is a schematic structural diagram of a stripe server according to an embodiment of the present invention.

Based on the foregoing description, an embodiment of the present invention further provides a stripe server, used in a storage system in the embodiments of the present invention, for example, a distributed storage system. The storage system includes N data storage nodes that store data chunks and M parity storage nodes that store parity chunks. R stripes are distributed on the N+M storage nodes, each stripe $S_i$ includes N data chunks and M parity chunks, a data chunk $D_{ix}$ is distributed on an $x^{th}$ storage node in the N data storage nodes, and a parity chunk $P_{iy}$ is distributed on a $y^{th}$ storage node in the M parity storage nodes. N, M, and R are positive integers, R is not less than 2, a value of i is an integer ranging from 1 to R, a value of x is an integer ranging from 1 to N, and a value of y is an integer ranging from 1 to M. As shown in FIG. 9, the stripe server includes a selection unit 901, a generation unit 902, and a storage unit 903. The selection unit 901 is configured to select the R stripes, where a maximum of one data chunk includes valid data in data chunks $D_{ix}$ that are in the R stripes and that are distributed on a same data storage node. The generation unit 902 is configured to generate parity data of a parity chunk $P_{Ky}$ of a new stripe $S_K$ for data of the data chunk including valid data in the R stripes, where K is an integer different from 1 to R, and the new stripe $S_K$ includes the data chunk including valid data in the R stripes and the parity chunk $P_{Ky}$. The storage unit 903 is configured to store the parity data of the parity chunk $P_{Ky}$ on the $y^{th}$ storage node in the M parity storage nodes.

Further, the stripe server shown in FIG. 9 further includes an indication unit, configured to indicate a data storage node on which a data chunk that stores garbage data of the R stripes is distributed to perform garbage collection. Further, the stripe server shown in FIG. 9 further includes a releasing unit, configured to release the R stripes. Further, the stripe server shown in FIG. 9 further includes a determining unit, configured to determine the stripe $S_i$, where a quantity of data chunks including garbage data in the stripe $S_i$ meets a reassembly threshold.

For an implementation of the stripe server shown in FIG. 9 in this embodiment of the present invention, refer to the foregoing described functions and structures of the stripe server in the embodiments of the present invention. Another implementation of the stripe server shown in FIG. 9 in this embodiment of the present invention may be implemented by software modules, or implemented by a combination of software and hardware.

Correspondingly, an embodiment of the present invention further provides a computer-readable storage medium and a computer program product. The computer-readable storage medium and the computer program product include a computer instruction, to implement various solutions described in the embodiments of the present invention.

In the embodiments of the present invention, identifiers used to describe stripes, data chunks, parity chunks, and storage nodes are merely used to describe the embodiments of the present invention more clearly. In actual product implementation, similar identifiers are not necessarily required. Therefore, in the embodiments of the present invention, the identifiers used to describe the stripes, the data chunks, the parity chunks, and the storage nodes are not intended to limit the present invention.

In this embodiment of the present invention, that the stripe $S_i$ includes N data chunks and M parity chunks, a data chunk $D_{ix}$ is distributed on an $x^{th}$ data storage node in the N data storage nodes, and a parity chunk $P_{iy}$ is distributed on a $y^{th}$ parity storage node in the M parity storage nodes, means that the $x^{th}$ data storage node in the N data storage nodes provides a storage address for the data chunk $D_{ix}$, data of the data chunk $D_{ix}$ is stored at the storage address provided by the $x^{th}$ data storage node in the N data storage nodes, the $y^{th}$ parity storage node in the M parity storage nodes provides a storage address for the parity chunk $P_{iy}$, and parity data of the parity chunk $P_{iy}$ is stored at the storage address provided by the $y^{th}$ parity storage node in the M parity storage nodes. Therefore, this is also referred to as that the stripe $S_i$ is distributed on the N+M storage nodes.

In the several embodiments provided in the present invention, it should be understood that the disclosed apparatus and method may be implemented in other manners. For example, division into the units in the described apparatus embodiment is merely logical function division and another division may be used in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A stripe reassembling method for a storage system, wherein the storage system comprises N data storage nodes that store data chunks and M parity storage nodes that store parity chunks; R stripes are distributed on N+M storage nodes, each stripe $S_i$ comprises N data chunks, $D_{ix}$, and M parity chunks, $P_{iy}$, a data chunk $D_{ix}$ is distributed on an $x^{th}$ data storage node in the N data storage nodes, and a parity chunk $P_{iy}$ is distributed on a $y^{th}$ parity storage node in the M parity storage nodes; and N, M, and R are positive integers, R is not less than 2, i is an integer ranging from 1 to R, x is an integer ranging from 1 to N, and y is an integer ranging from 1 to M; and the method comprises:

selecting, by a stripe server, the R stripes, wherein, in the R stripes, among data chunks $D_{ix}$ stored on a same data storage node, at most one data chunk comprises valid data;

generating, by the stripe server, parity data of a parity chunk $P_{Ky}$ of a new stripe $S_K$ for data in the data chunk comprising valid data in the R stripes, wherein the new stripe $S_K$ comprises the data chunk comprising valid data in the R stripes and the parity chunk $P_{Ky}$, and K is an integer different from 1 to R; and storing, by the stripe server, the parity data of the parity chunk $P_{Ky}$ on the $y^{th}$ parity storage node in the M parity storage nodes.

2. The method according to claim 1, wherein after the storing, by the stripe server, the parity data of the parity chunk $P_{Ky}$ on the $y^{th}$ parity storage node in the M parity storage nodes, the method further comprises:

instructing, by the stripe server, a data storage node on which a data chunk that stores garbage data of the R stripes is distributed to perform garbage collection.

3. The method according to claim 2, wherein after the storing, by the stripe server, the parity data of the parity chunk $P_{Ky}$ on the $y^{th}$ parity storage node in the M parity storage nodes, the method further comprises:

releasing, by the stripe server, the R stripes.

4. The method according to claim 1, wherein before the selecting, by the stripe server, the R stripes, the method further comprises:

determining, by the stripe server, the stripe $S_i$, wherein a quantity of data chunks comprising garbage data in the stripe $S_i$ meets a reassembly threshold.

5. A stripe server, wherein the stripe server is used in a storage system, and the storage system comprises N data storage nodes that store data chunks and M parity storage nodes that store parity chunks; R stripes are distributed on N+M storage nodes, each stripe $S_i$ comprises N data chunks $D_{ix}$ and M parity chunks $P_{iy}$, a data chunk $D_{ix}$ is distributed on an $x^{th}$ storage node in the N data storage nodes, and a parity chunk $P_{iy}$ is distributed on a $y^{th}$ storage node in the M parity storage nodes; N, M, and R are positive integers, R is not less than 2, a value of i is an integer ranging from 1 to R, a value of x is an integer ranging from 1 to N, and a value of y is an integer ranging from 1 to M; and the stripe server comprises an interface and a processor, the interface communicates with the processor, and the processor is configured to:

select the R stripes, wherein at most one data chunk among data chunks $D_{ix}$ that are in the R stripes and are distributed on a same data storage node comprises valid data;

generate parity data of a parity chunk $P_{Ky}$ of a new stripe $S_K$ for data in the data chunk comprising valid data in the R stripes, wherein the new stripe $S_K$ comprises the data chunk comprising valid data in the R stripes and the parity chunk $P_{Ky}$, and K is an integer different from 1 to R; and store the parity data of the parity chunk $P_{Ky}$ on the $y^{th}$ storage node in the M parity storage nodes.

6. The stripe server according to claim 5, wherein the processor is further configured to instruct a data storage node on which a data chunk that stores garbage data of the R stripes is distributed to perform garbage collection.

7. The stripe server according to claim 6, wherein the processor is further configured to release the R stripes.

8. The stripe server according to claim 5, wherein the processor is further configured to determine the stripe $S_i$, wherein a quantity of data chunks comprising garbage data in the stripe $S_i$ meets a reassembly threshold.

9. A non-transitory computer-readable storage medium, wherein the non-transitory computer-readable storage medium stores a computer program that comprises a computer instruction, the computer program is used in a storage system, the storage system comprises N data storage nodes that store data chunks and M parity storage nodes that store parity chunks; R stripes are distributed on N+M storage nodes, each stripe $S_i$ comprises N data chunks, $D_{ix}$, and M parity chunks, $P_{iy}$, a data chunk $D_{ix}$ is distributed on an $x^{th}$ storage node in the N data storage nodes, and a parity chunk $P_{iy}$ is distributed on a $y^{th}$ storage node in the M parity storage nodes; N, M, and R are positive integers, R is not less than 2, i is an integer ranging from 1 to R, x is an integer ranging from 1 to N, and y is an integer ranging from 1 to M; and a stripe server that is used in the storage system executes the computer instruction, to perform the following operations:

selecting the R stripes, wherein a maximum of one data chunk among data chunks $D_{ix}$ that are in the R stripes and that are distributed on a same data storage node comprises valid data;

generating parity data of a parity chunk $P_{Ky}$ of a new stripe $S_K$ for data of the data chunk comprising valid data in the R stripes, wherein the new stripe $S_K$ comprises the data chunk comprising valid data in the R stripes and the parity chunk $P_{Ky}$, and K is an integer different from 1 to R; and storing the parity data of the parity chunk $P_{Ky}$ on the $y^{th}$ storage node in the M parity storage nodes.

10. The non-transitory computer-readable storage medium according to claim 9, wherein the stripe server executes the computer instruction, to further instruct a data storage node on which a data chunk that stores garbage data of the R stripes is distributed to perform garbage collection.

11. The non-transitory computer-readable storage medium according to claim 10, wherein the stripe server executes the computer instruction to release the R stripes.

12. The non-transitory computer-readable storage medium according to claim 9, wherein the stripe server executes the computer instruction, to determine the stripe $S_i$, wherein a quantity of data chunks comprising garbage data in the stripe $S_i$ meets a reassembly threshold.

* * * * *

UNITED STATES PATENT AND TRADEMARK OFFICE
CERTIFICATE OF CORRECTION

PATENT NO. : 11,899,533 B2
APPLICATION NO. : 17/356849
DATED : February 13, 2024
INVENTOR(S) : Yun Zhan et al.

It is certified that error appears in the above-identified patent and that said Letters Patent is hereby corrected as shown below:

On the Title Page

In item (57), in Column 2, in "Abstract", Line 6, delete "S3 ;" and insert -- S3; --.

Signed and Sealed this
Seventh Day of May, 2024

Katherine Kelly Vidal
*Director of the United States Patent and Trademark Office*